United States Patent
Kelley et al.

(10) Patent No.: US 6,767,695 B2
(45) Date of Patent: Jul. 27, 2004

(54) CDROM COPY PROTECTION

(75) Inventors: Edward E. Kelley, Wappingers Falls, NY (US); Eric M. Motika, Hopewell Junction, NY (US); Franco Motika, Hopewell Junction, NY (US); Paul V. Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 09/764,836

(22) Filed: Jan. 17, 2001

(65) Prior Publication Data

US 2002/0093905 A1 Jul. 18, 2002

(51) Int. Cl.[7] ................................................. G11B 7/00
(52) U.S. Cl. .................... 430/320; 364/275.4; 714/719; 714/718
(58) Field of Search ................................. 430/320, 321; 369/245.4; 714/719, 718

(56) References Cited

U.S. PATENT DOCUMENTS

| | | | | |
|---|---|---|---|---|
| 4,930,116 A | * | 5/1990 | Dil | 369/275.1 |
| 5,570,339 A | | 10/1996 | Nagano | 369/275.3 |
| 5,696,757 A | | 12/1997 | Ozaki et al. | 369/275.4 |
| 5,703,858 A | * | 12/1997 | Mitchell et al. | 369/58 |
| 5,805,551 A | | 9/1998 | Oshima et al. | 369/59 |
| 5,809,006 A | | 9/1998 | Davis et al. | 369/275.4 |
| 5,923,754 A | | 7/1999 | Angelo et al. | 380/4 |
| 6,057,082 A | | 5/2000 | Korth | 430/320 |

FOREIGN PATENT DOCUMENTS

| | | | |
|---|---|---|---|
| JP | 8-7340 | | 1/1996 |
| WO | 98/08180 | * | 2/1998 |

* cited by examiner

*Primary Examiner*—Martin Angebranndt
(74) *Attorney, Agent, or Firm*—Jay H. Anderson; Scully, Scott, Murphy & Presser

(57) ABSTRACT

A method of forming an optical disc, and an optical disc formed, so as to facilitate identifying unauthorized copies of the disc by using a defined procedure for reading the disc. The method comprises the steps of encoding digital data, comprised of a series of 0s and 1s, in the disc by forming a series of spaced pits along a track, so that the track comprises a series of pits and lands, and wherein, when said defined procedure is used to read the disc, each of said pits and lands is read as either a 0 or a 1. The method comprises the further step of forming at least one fuzzy area on the track so that when the defined procedure is used to read the disc, the fuzzy area is sometimes read as 0 and sometimes read as 1. With a preferred procedure, the pits reflect a given light beam at a first intensity, the lands reflect the given light at a second intensity, and the fuzzy area reflects the given light at a third intensity substantially midway between the first and second intensities.

3 Claims, 5 Drawing Sheets

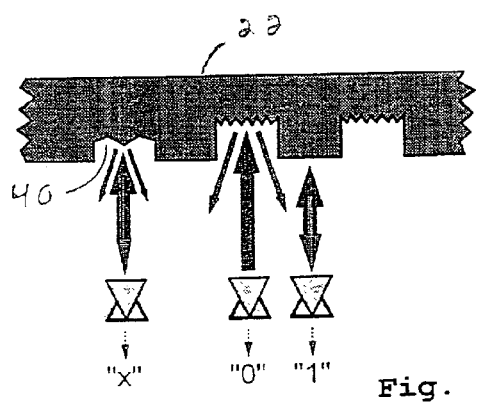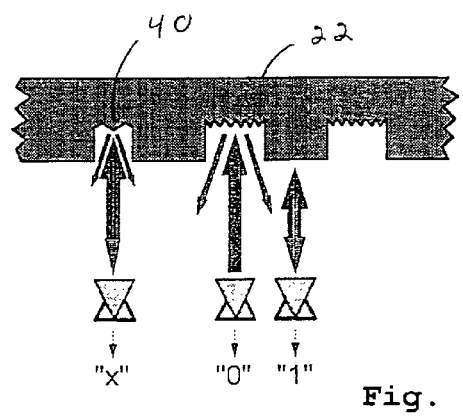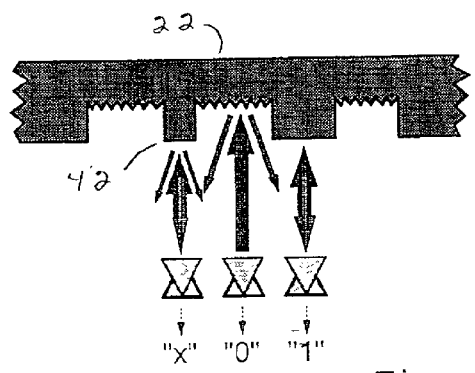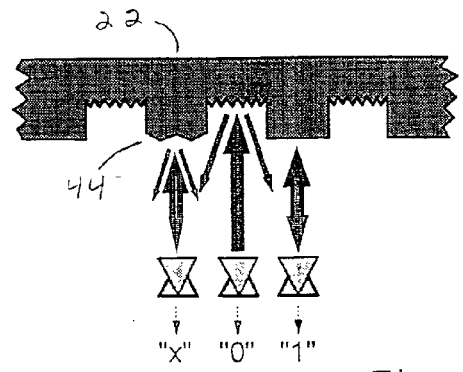
"Fuzzy" Read-Write Methods

CDROM COPY PROTECTION

BACKGROUND OF THE INVENTION

1. Field of the Invention

This invention generally relates to copy protection of CDROM media. More specifically, the invention addresses the problem of the illegal copying and distribution (or "pirating") of copyrighted digital information written on CD type storage media. This proprietary information may include a variety of software programs such as operating system software, application programs, and entertainment games.

2. Prior Art

The preferred method of commercially distributing software packages in today's information age is to use a relatively inexpensive and simple to read CDROM media. Data are recorded in a CDROM along a substantially spiral line beginning at an interior radius and continuing out to larger radii. Data is recorded on the disk in the form of bit indications consisting of lands and pits alternating along the centerline, the arcuate length of each land or pit indicating the number of sequential "zero" bits in the data. The data to be recorded on the disk are converted from binary to a format known as eight-to fourteen modulation (EFM). The EFM data is written at a constant linear velocity (CLV) along the spiral, such that the "1" in the EFM data produces a transition from land to pit or vice versa, and each "0" in the EFM data produces no transition.

Until recently this approach was relatively secure from "pirating" since the equipment to write CDROMs was technically complex, quite expensive, and not readily available. In the last couple of years, however, advances in CD technology have developed writeable CDROM equipment that is readily available and inexpensive.

These writeable CDROM drives, supporting software, and blank CDROMs can be purchased for a few hundred dollars and easily installed on most personal computers.

The capability to use CDROMs for general user storage applications, both read-only and write-once, is of great benefit to the individual personal computer user and the computer industry as a whole. This analog and digital storage technology provides a reliable and inexpensive high capacity storage media for a wide range of digital and analog applications, but at the same time, this technology is susceptible to illegal reproduction of proprietary data. Unless a reliable copy protection method is developed, these benefits may not be fully achieved.

One current solution to this problem is to provide indirect protection by associating a control number with the CDROM media that is requested while installing the software package. This control number is provided with the original CDROM, but can be easily copied and distributed with the illegally copied CDROM.

Another solution is to provide specific or temporary licensing for the application software. This approach requires additional ongoing support, is inconvenient, more restrictive, and more expensive to distribute. Although this approach can achieve copy protection of extensive software packages for large systems, it is not applicable to individual or personal computing software distribution.

SUMMARY OF THE INVENTION

An object of this invention is to protect copyrighted digital information on CD type storage media.

Another object of the present invention is to provide a method and system for protecting copyrighted digital information on CD type storage media that are easy to implement, are compatible with CDROM mass production, and provide almost foolproof copy protection.

A further object of this invention is to protect copyrighted digital information on CD type storage media in a way that does not require any additional distribution costs, is applicable to a wide variety of application software packages, and is extensible to digitized audio and video media.

Further benefits and advantages of the invention will become apparent from a consideration of the following detailed description, given with reference to the accompanying drawings, which specify and show preferred embodiments of the invention.

These and other objectives are attained with a method of forming an optical disc, and an optical disc formed, so as to facilitate identifying unauthorized copies of the disc by using a defined procedure for reading the disc. The method comprises the steps of encoding digital data, comprised of a series of 0s and 1s, in the disc by forming a series of spaced pits along a track, so that the track comprises a series of pits and lands, and wherein, when said defined procedure is used to read the disc, each of said pits and lands is read as either a 0 or a 1. The method comprises the further step of forming at least one fuzzy area on the track so that when the defined procedure is used to read the disc, the fuzzy area is sometimes read as 0 and sometimes read as 1. With a preferred procedure, the pits reflect a given light beam at a first intensity, the lands reflect the given light at a second intensity, and the fuzzy area reflects the given light at a third intensity substantially midway between the first and second intensities.

BRIEF DESCRIPTION OF THE DRAWINGS

FIGS. 6–9 show how a compact disc may be formed so as to provide a fuzzy read.

DETAILED DESCRIPTION OF THE PREFERRED EMBODIMENTS

Figure 1:
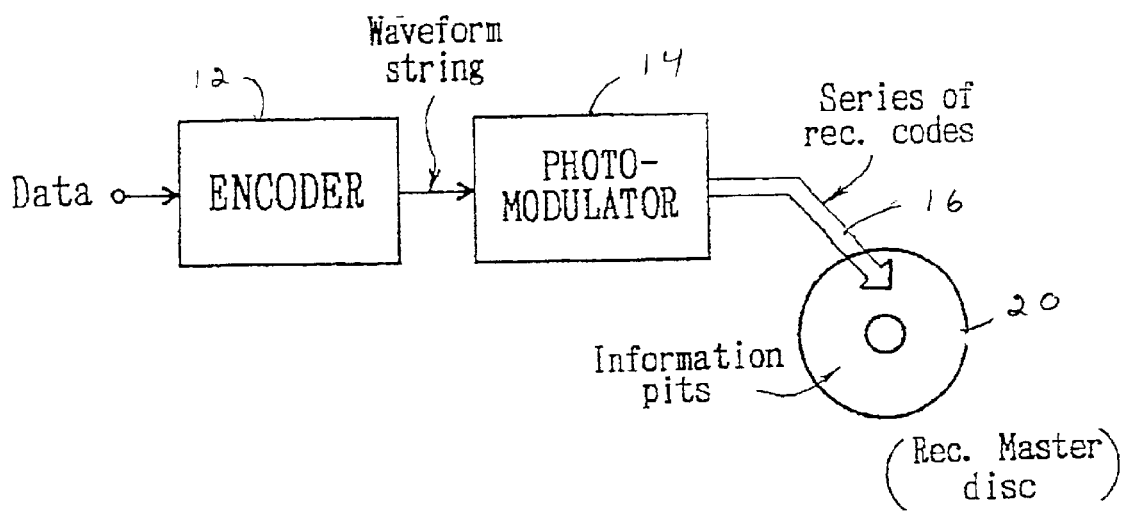
FIG. 1 is a block diagram showing a procedure for recording a master compact disc.

With reference to FIG. 1, to make an optical disc, analog input signals, which may be sound signals, are converted into a predetermined digital data by an A/D converter (not shown) and the digital data are inputted to an encoder 12. These digital data are converted into a waveform string on the basis of predetermined conversion rules by the encoder, and this waveform string is inputted to a photomodulator 14. This waveform string is amplified by the photomodulator, and is converted into a series of recording codes for driving a laser generator (not shown). The laser generator generates a laser beam 16, carrying a series of recording codes as an intensity modulated light beam, in response to the series of recording codes.

A photo-resist coated on the recording master disc 20 is exposed to the laser beam 16 carrying the series of recording codes, so that exposed portions that are to become information pits are formed in accordance with the series of recording codes. The photo-resist is then developed, causing an information pit pattern to be formed on the photo-resist. From the recording master disc 20 provided with the photo-resist having the information pit pattern, a stamper (not shown) is formed through known processes.

Figure 2:
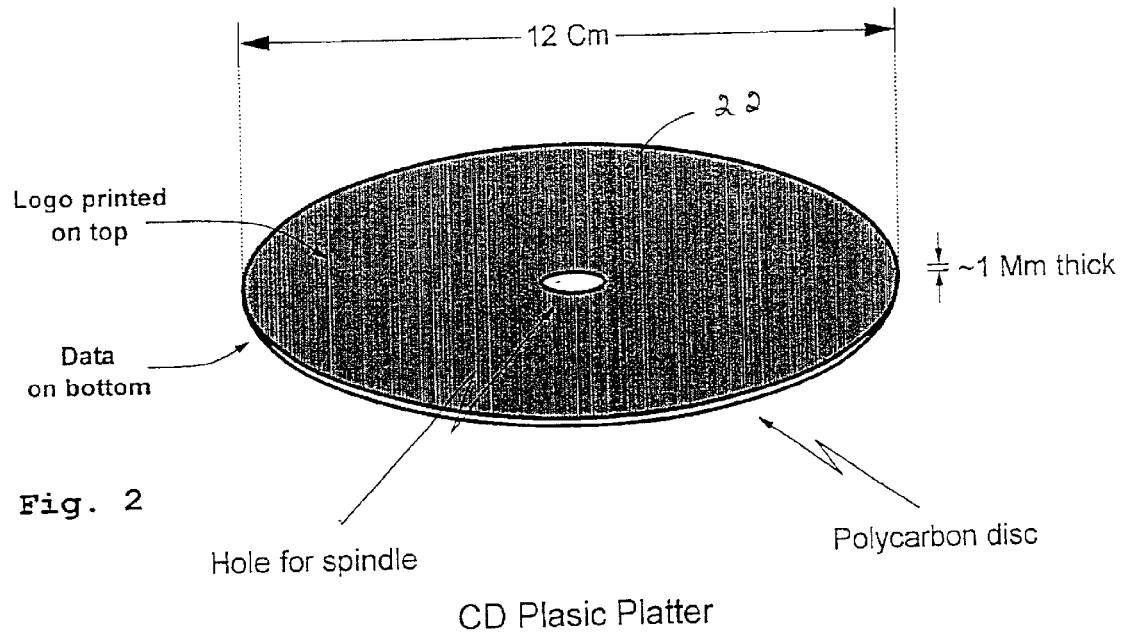
FIGS. 2 and 3 illustrate a compact disc made from the master disc.
Figure 3:
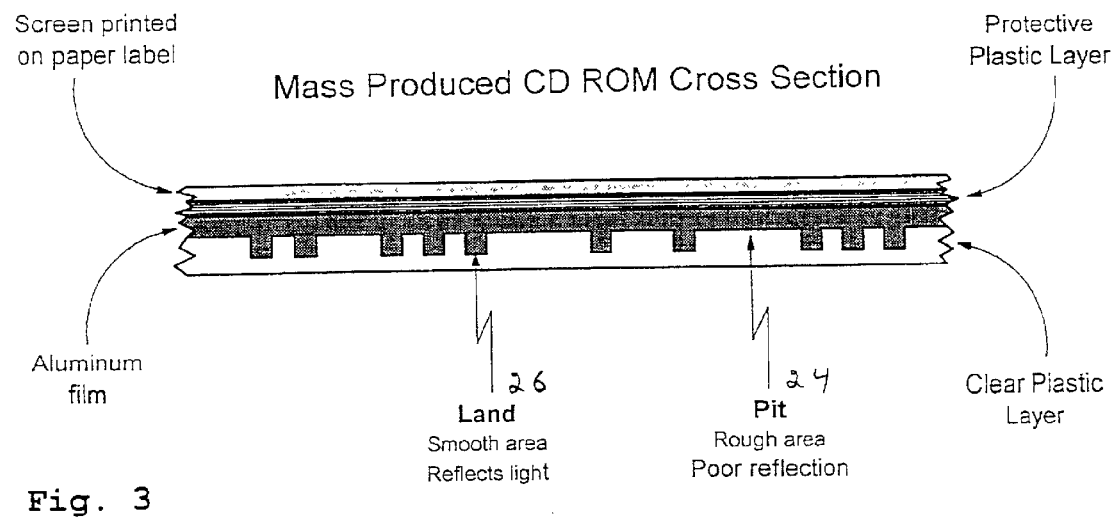
Figure 4:
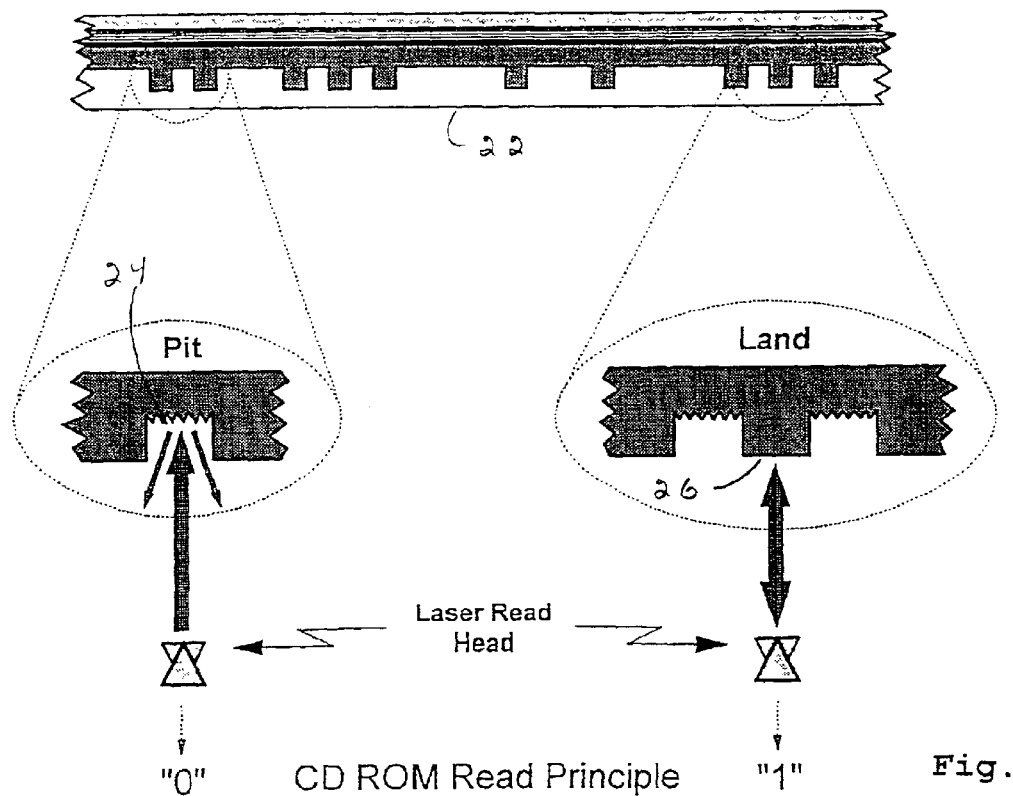
FIG. 4 illustrates how a compact disc can be read.

With reference to FIGS. 2 and 3, a replica of the information pit pattern formed on the photo-resist is then transferred to a polycarbonate substrate by injection-molding of polycarbonate resin, using the stamper as a metal mold. Thus, the CD 22 is obtained, having a predetermined sequence of pits 24 and lands 26, by performing a known process on the polycarbonate substrate. Any suitable procedure may be used to read the CD. For example, as represented in FIG. 4, the pits may be read as "0"s and the lands may be read as "1"s.

Figure 5:
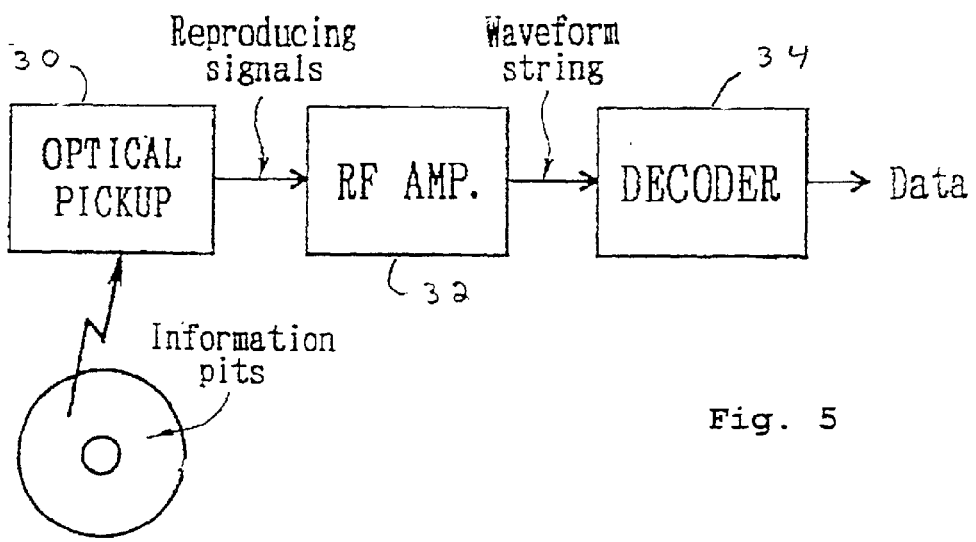
FIG. 5 is a block diagram showing a procedure for making a copy of the compact disc.

A procedure for copying the CD is illustrated in FIG. 5. The information pit rows on the CD are constantly irradiated with a laser beam emitted by a laser element that is one of the components of an optical pickup 30. As a result, the irradiated laser beam is reflected from a surface of the CD as an intensity modulated beam of light responsive to positions and shapes of the information pits and lands. Reproduction signals are obtained by the optical pickup 30, which thus detects the modulated reflected beam of light.

The reproduction signals are inputted to an RF amplifier 32. After being amplified thereby, the reproduction signals are outputted as a waveform string and are inputted to a decoder 34 after having been subjected to a wave equalization and to a discriminating process (not shown). From the decoder 34, a series of data are obtained by an inverse conversion of the series of codes recorded on the CD, and the series of data are converted into sound or other signals by a D/A converter (not shown).

When information such as music, picture or character information is in a form of digital information, quality of the information is not degraded upon copying or transferring the information because of an inherent characteristic of the digital information transmission, compared with analogue form thereof. While this feature, generally, is very advantageous, there is, though, an associated problem of unauthorized copying.

The present invention addresses the problem of illegal copying of digital information written on CD type storage media by using a method referred to as a "Fuzzy-Write" method supported by a built-in "Fuzzy-Read" detection algorithm. Normally, when a digital "0" or "1" is written to a storage media, the read operation retrieves the appropriate data in the absence of an error. When a read error occurs it is typically as a result of "noise" while reading and decoding the data. These read errors can often be detected and corrected by special error correction codes. A good writing and reading process maximizes the signal to noise ratio of the "0" and "1" write and read signals to minimize the probability of error.

The present invention utilizes the intentional introduction of errors or "marginally" written data to prevent unauthorized duplication and to detect illegal copies of the data. This can be achieved by writing "weak" 0 and 1 bits in a known position or address on the storage media and than detecting the expected error during the read operation. If the expected errors are not detected in the predetermined locations during the read operation, then the data are invalid or illegally copied.

Hardware/Software Description

The "Fuzzy" 1 or 0, denoted as an "x" can be written on the CDROM in one of several ways, as shown in FIGS. 5–9. The preferred procedure is to modify the write process so that the "Fuzzy" bit is read half of the time as a "1" and the other half of the time as a "0." In the case of a CDROM write/read process, this can be achieved by controlling the amount of reflected laser light from the pits and lands.

In FIGS. 6 and 7, the pit structure 40 is modified to increase the reflection and make a "0" appear more like a "1." Alternatively, in FIGS. 8 and 9, the land is modified, for example, as shown at 42 and 44, to reflect less light and make a "1" appear more like a "0." The width as well as the surface smoothness of each pit and land can be altered to control the amount of reflected light from the laser read head to the light sensor. This "Fuzzy" write process may be done using CDROM write or laser photo etching equipment.

Similarly, when these "weakly" written bits are read, the decoded output could be either a 0 or a 1. If the same address or bit is read several times, there is a likelihood that both a 0 and a 1 will be eventually decoded by the reflected light comparator. Since the reflected signal from the "weak" bit can be controlled during the write operation to be midway between the nominal 0 and 1 level, the signal to noise ratio is greatly reduced, thereby increasing the probability of an "x" detect during the read operation.

It is this intermittent or "fuzzy" read operation that can be used by the software algorithm to determine if the CDROM has been illegally copied. A typical copy operation, as described above, reads the data from the source CDROM and copies it to a target CDROM. This process reads each 0 and 1 and copies it to the target drive. If the CDROM is a protected media and contains "weak" bits, the normal read operation will detect the "weak" bit as a 0 or a 1 and write one or the other, but not an "x," to the target CDROM. It is this difference between the original CDROM and the illegal copy that can be detected by the "weak" bit read algorithm. A basic detection algorithm can be integrated, for example, into error detection and correction schemes used in typical CDROM designs.

Copy Protection Implementation

Several copy protection implementation techniques can be realized using the basic approach described above. As an example, suppose that an application software package is being distributed on a copy protected CDROM. A multitude of addresses have been written and embedded in the data using the "weak" bit procedure. The CDROM also contains a load and installation package tailored specifically for the software package, and this installation program also incorporates the "weak" read algorithm.

During the application software installation, the algorithm is invoked to determine if the CDROM contains "weakly" written bits at the pre-determined addresses. This may be accomplished by reading each of those addresses several times until an "x" is detected (i.e., a 0 and a 1). If after a pre-defined number of attempts, the "x" bits are not detected, then the installation process is terminated and the CDROM declared as containing invalid data.

Copy Protection Load Program

The preferred copy protection has four features designed to deter easy copying of the data by substitution of the load program by another program designed to be placed in memory to bypass the load program on the disk. The goal is to make it difficult to devise a standard program to read the disk or the load program to find the correct information to bypass the load program. This is accomplished by not placing the addresses of the fuzzy bits in a standard place on the disk or a standard place in the program and by giving initialized variables that contain the addresses of the fuzzy bits a randomly selected name and by including a hit percentage.

While one could physically read the load program and determine the location in the program to find the fuzzy bit addresses, these locations would always vary on each load program on each disk. Not placing the addresses in a standard place on the disk is accomplished by randomly selecting the addresses of the fuzzy bits and by hard coding the addresses directly into the program in an initialized variable. The location of the initialized variable is altered each time a new disk is created by randomly placing innocuous code at various places in the program and innocuous initialized variables at random places in the code. The code that reads the randomly named address variables will correctly point to the addresses as the instruction will be correctly named when the load program is generated on the disc.

The hit percentage is the percentage of time the fuzzy bit will be read as a 1. For example, the fuzzy bit can be constructed so that the percentage of hits can be from 1 to 99%. In addition a hit percentage is also included in the program in a randomly selected place in the program and with a random variable name. Likewise, the section of the program that reads the hit percentage will point to the correct variable because it will be correctly named when the load program is generated on the disk.

Flow Chart Description

Figure 10:
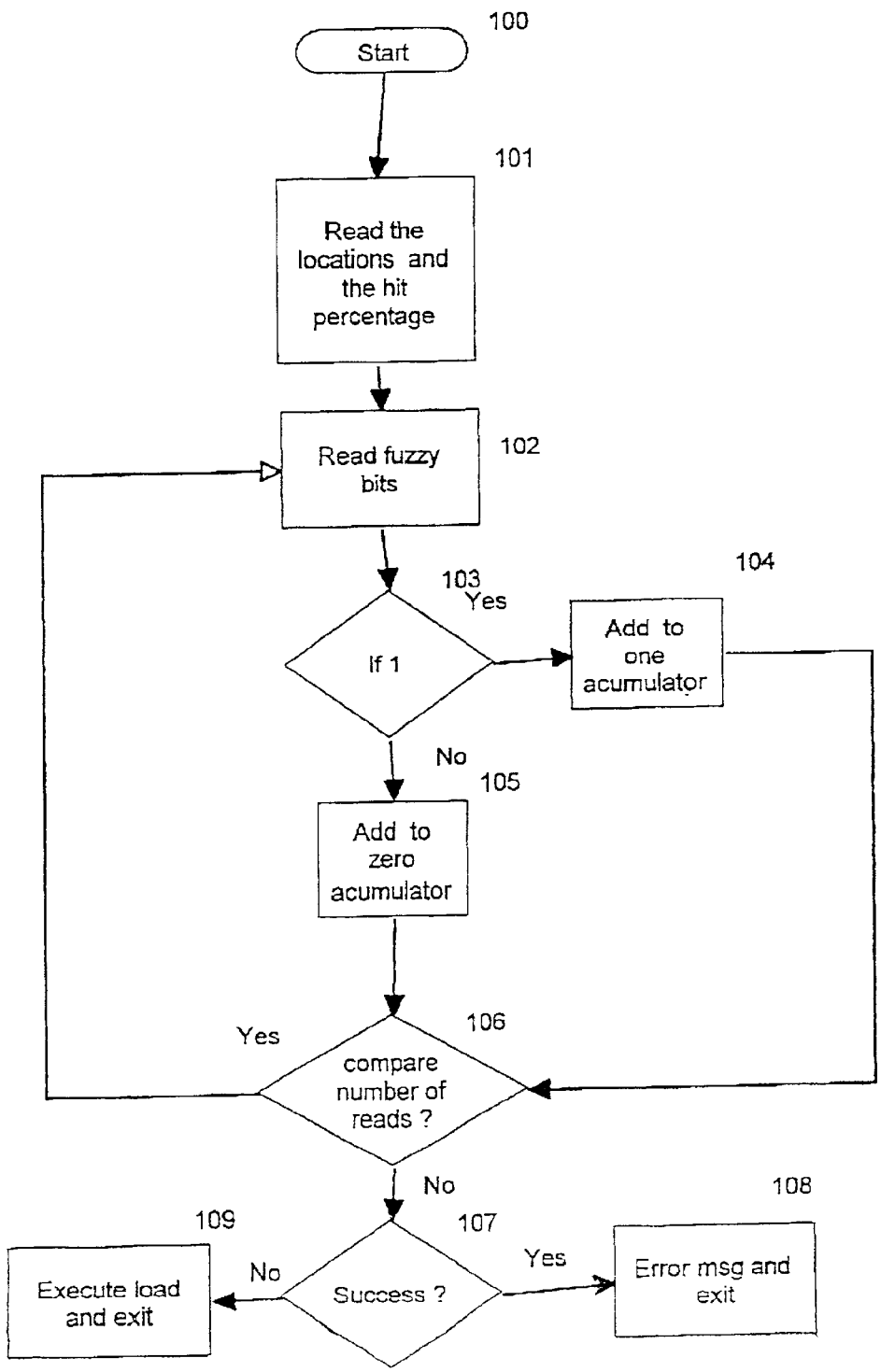
FIG. 10 is a flow chart illustrating a procedure for determining if a disc is an authorize or unauthorized copy.

With reference to FIG. 10, at step 100, the program is started. Step 101 is to read the locations and the hit percentage. The load program will read the addresses of the fuzzy bits and the hit percentage. The locations in the code and the names of the variables that contain this information will have been variably generated. At step 102, the fuzzy bits are read. The load program will go to the addresses on the disk to read the fuzzy bits. If a 1 is read, as represented by step 103, then an add is made to a one accumulator, at step 104. In this way, the program keeps track of the number of times a one was registered. If, at step 103, a 1 is not read, then an add is made to a zero accumulator, as represented at step 105, keeping track of the number of times a zero is registered. At step 106, the number of 1 reads and the number of 0 reads are compared. At step 107, the number of 1s are compared to the given value of the hit percentage. If this number of 1s does not equal the hit percentage, an error message is detected, as represented at step 108. If the number of 1s is equal to the hit percentage, the test is considered positive and the load is executed, and in particular, the part of the load program that loads data into main memory is executed.

The present invention is superior to the prior art methods discussed above, because the invention provides a generic solution with a number of important benefits. For instance, the present invention is relatively easy to implement, is compatible with CDROM mass production, and provides almost foolproof copy protection. Further, this invention does not require any additional distribution costs, is applicable to a wide variety of application software packages, and is extensible to digitized audio and video media.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of forming optical discs so as to facilitate idenifying unauthorized copies of the discs, for use with a defined procedure for reading the discs, the method comprising:

encoding digital data, comprised of a series of 0s and 1s, in the discs by forming a series of spaced pits along a track in each disc, so that each track comprises a series of pits and lands, and wherein, when said defined procedure is used to read the discs, each of said pits and lands is read as either a 0 or a 1;

forming at least one fluzzy area on the truck of each disc so that when the defined procedure is used to read the disc, the fuzzy area is sometimes reed as 0 and sometimes read as 1;

providing each disc with a program having a variable identifying the address of the at least one fuzzy area on the disc; and varying the locations of said variables in the programs on the different discs.

2. A method according to claim 1, further including the steps of providing a name for said variable on each disc, and varying the names of said variables on the different discs.

3. A method according to claim 1, further including the step of providing said program on each disc with a hit percentage value indicating the number of times the fuzzy area is read as a 1, and varying the locations of the hit percentage values in the programs on the discs.

* * * * *